UNITED STATES PATENT OFFICE.

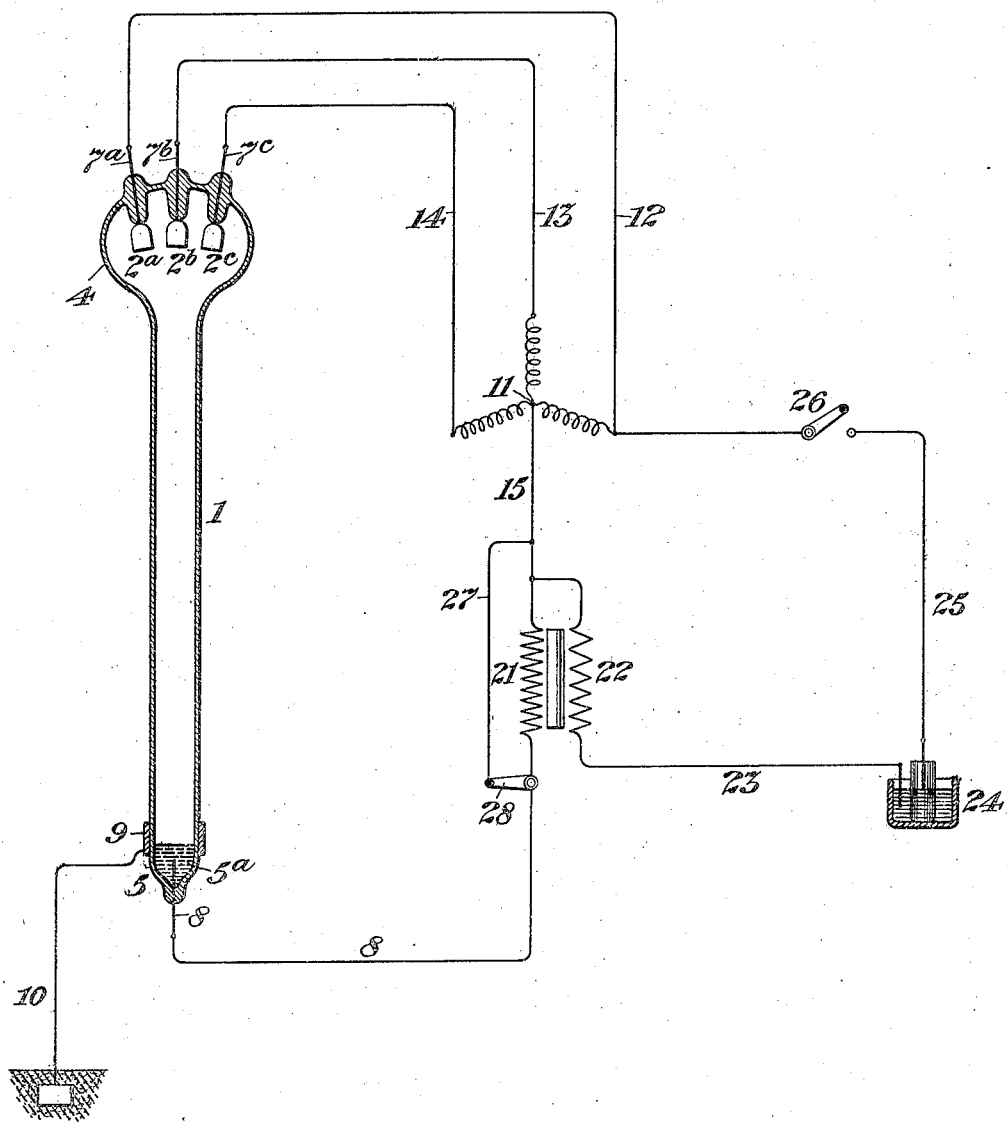

PETER COOPER HEWITT, OF RINGWOOD MANOR, NEW JERSEY, ASSIGNOR, BY MESNE ASSIGNMENTS, TO COOPER HEWITT ELECTRIC CO., OF HOBOKEN, NEW JERSEY, A CORPORATION OF NEW JERSEY.

METHOD OF TRANSMITTING AND UTILIZING ELECTRIC CURRENTS.

1,110,547.  Specification of Letters Patent.  Patented Sept. 15, 1914.

Original application filed April 5, 1901, Serial No. 54,485. Divided and this application filed January 14, 1909. Serial No. 472,185.

*To all whom it may concern:*

Be it known that I, PETER COOPER HEWITT, a citizen of the United States, and resident of Ringwood Manor, county of Passaic, State of New Jersey, have invented certain new and useful Improvements in Method of Transmitting and Utilizing Electric Currents, of which the following is a specification.
In certain patents granted to me on the 17th day of September, 1901, I have described a form of electric device in which a gas or vapor path is traversed by electric currents. I have also set forth certain peculiarities with reference to the so-called negative electrode reluctance.

I have found that the principal resistance opposed to the starting of the flow of electric current through a device of the character refererd to, exists at the negative electrode, and that when such resistance is broken down or overcome current will pass under the influence of comparatively low electro-motive-forces. This resistance to starting at the negative electrode may, for convenience, be termed the negative electrode reluctance.

I have found, moreover, that so long as the negative electrode resistance remains overcome, the positive electrode from which current is flowing may be replaced by another current carrying positive electrode, without causing a cessation of the flow of current to the negative electrode.
It results therefore, that if a device of this character be provided with several positive electrodes which are connected successively with sources of positive electromotive-forces, current may be caused to flow successively from the several positive electrodes through the device to the negative electrode, proivded that at all times a sufficient electro-motive-force is presented to the terminals of the device by means of any of the positive electrodes and the negative electrode to prevent the negative electrode reluctance from reëstablishing itself.

I have further found that even though one of the positive electrodes were negative with reference to another, current would not flow from such positive electrode to such temporary negative electrode without first breaking down the negative electrode reluctance at said electrode.

Another feature which I have discovered is that when such device is being operated by current flowing from the positive to the negative electrode, the device offers a barrier to the flow of current in the reverse direction by reason of the negative electrode reluctance which would reside at the positive becoming negative. Moreover, any leakage current which may pass from one positive electrode to another is so small as to be negligible. By reason of these characteristics, I am enabled to use the device in connection with polyphase alternating electric currents by providing a positive electrode for each phase of the current and connecting the negative electrode to a neutral point of the source with reference to the several positives. In a three - phase system, for instance, the polyphase currents overlapping each other, in time, will cause a positive electro-motive-force to be at all times impressed upon one or more of the positive electrodes so that there may always be a flow of current through the device in a given direction while in operation.

It will follow that there will be present in the circuit leading from the negative electrode back to the source, a flow of current in one direction only, the quantity of this current being dependent upon the resistance of the circuit and the effective electro-motive-forces presented to the terminals of the device.

Generally speaking, my invention may be stated to involve the supplying of a positive electrode for each phase of the alternating current and substituting these electrodes for each other with the successive alternations of current, a single negative electrode being common to all of the positives.

Where this device is desired to be used as an illuminating device or a lamp, the path between the several positive electrodes and the negative electrode is constructed of such a length and diameter as to present a vapor path suitable for giving light and having the desired electrical resistance. This may be accomplished in accordance with the directions given in my patents hereinbefore referred to.

There are many uses to which the device may be applied such, for instance, as operating various classes of apparatus requiring currents continuous in direction, the charging of storage batteries, electrolytic operations, etc.

The accompanying drawing illustrates the general organization of the apparatus and circuits as applied to a three-phase circuit.

Referring to the drawing, 1 represents an inclosing chamber which may be of glass or other suitable material, and $2^a$, $2^b$ and $2^c$, represent there positive electrodes which are suitably supported within the chamber, and connected with their respective leading-in conductors, $7^a$, $7^b$, and $7^c$. In the drawing these electrodes are shown as being contained within an enlargement 4. The negative electrode, 5, is shown as consisting, in this instance, of a small body of mercury with which a leading-in wire, 8, makes connection. I have illustrated a source of polyphase current, in this case, a three-phase generator, or a suitable transformer, adapted to deliver the requisite currents.

The respective terminals of the source are connected by conductors, 12, 13 and 14, with respective positive electrodes, $2^a$, $2^b$ and $2^c$. The neutral point of the source 11 is connected by a conductor 15, through any desired devices, with the leading-in wire 8.

For the purpose of starting the device, any suitable means may be employed. I usually surround the portion of the device adjacent to the negative electrode by a conducting band, 9, connected with any one of the conductors leading to the positive electrodes; or, it may be connected as in this instance with the earth by a conductor, 10. This serves to aid in starting a flow of current through the device.

A convenient way of starting the device and overcoming the negative electrode reluctance where the potential employed is not in itself sufficient to insure the starting, is to impress upon the terminals an electromotive-force higher than that required for its normal operation. This may be done in any convenient way as, for instance, by means of a potential raising device included in any one of the circuits. In the drawing, I have shown the coil 21 included in the conductor 15, this coil acting as a secondary to a primary coil, 22, included in the circuit of a suitable circuit-interrupter such, for instance, as a Wehnelt, 24, one terminal of the primary coil being connected with the conductor 15 and the other by the conductor 23, with one side of the Wehnelt, the other side of the Wehnelt being connected by a conductor 25, with the conductor 12 for instance. A switch 26 may be included in the conductor 25 for controlling its circuit connections, and a conductor 27 with a switch 28 may be employed for short-circuiting or cutting out of circuit, the coil 21. For special reasons the coil 21 may be put in other portions of the circuit, provided it is so arranged as to cause a momentary high electro-motive-force to be impressed upon the terminals of the device. Other means of starting the device may be employed, if desired.

When the flow of current has been started it will continue to pass in succession from the several electrodes $2^a$, $2^b$ and $2^c$, to the negative electrode 5, the successive electrodes being in effect substituted, the one for another, as the positive electro-motive-force applied to one falls, and the positive electro-motive-force to the succeeding one rises. During a portion of the time current may be flowing from more than one positive, the essential point being that there is always a sufficient flow of current through the device to maintain it in its conductive condition and to prevent the restoration of the negative electrode reluctance at the negative electrode.

The invention is useful in various cases where it is desired to derive a direct current from an alternating source. In effect such an apparatus as described herein serves the purpose of a rectifying device, whereby currents from a source of alternating currents pass through the apparatus and through the circuit connected therewith in one direction. The function and operation of the apparatus are the same whether it is itself used as a translating device or as a medium for transmitting a continuous current to other translating devices.

In another application Serial Number 54,485, filed April 5, 1901, of which this application is a division, claims are made upon certain of the methods disclosed herein.

In another application filed by me on April 5, 1901, Serial Number 54,484, now Patent 955,459, April 19, 1910, and various other pending applications I have made claims to the apparatus and other modes of operation of the invention herein described.

I claim as my invention:—

1. Means for starting a vapor electric apparatus comprising a plurality of anodes, a vaporizable cathode and a container therefor, said means consisting of an alternating supply connection from said supply to said anodes and a connection from an intermediate point of said supply to said cathode and a starting band adjacent said cathode connected to earth.

2. Means for starting a vapor electric apparatus comprising a plurality of anodes, a vaporizable cathode and a container therefor, said means consisting of an alternating supply connection from said supply to said anodes and a starting band adjacent said cathode connected to earth.

Signed at New York, in the county of New York, and State of New York, this 13th day of January, A. D. 1909.

PETER COOPER HEWITT.

Witnesses:
WM. H. CAPEL,
THOS. H. BROWN.